J. A. Eshleman.
Neck-Tie.

No. 2,448. Reissued Jan 8. 1867.

Witnesses
{ W. Albert Steel
{ C. Howson

Henry Howson
Witness
J. A. Eshleman

United States Patent Office.

J. ALBERT ESHLEMAN, OF PHILADELPHIA, PENNSYLVANIA.

*Letters Patent No.* 45,096, *dated January* 31, 1865; *reissue No.* 2,448, *dated January* 8, 1867.

IMPROVEMENT IN NECK-TIE HOLDERS.

The Schedule referred to in these Letters Patent and making part of the same.

TO ALL WHOM IT MAY CONCERN:

Be it known that I, J. ALBERT ESHLEMAN, of Philadelphia, Pennsylvania, have invented a "Cravat Holder;" and I do hereby declare the following to be a full, clear, and exact description of the same, reference being had to the accompanying drawing, and to the letters of reference marked thereon.

My invention consists of a holder secured in front of a collar so as to be detachable from the same, and adapted for the reception and retention of a detachable ribbon or tie as fully described hereafter.

Figure 1:
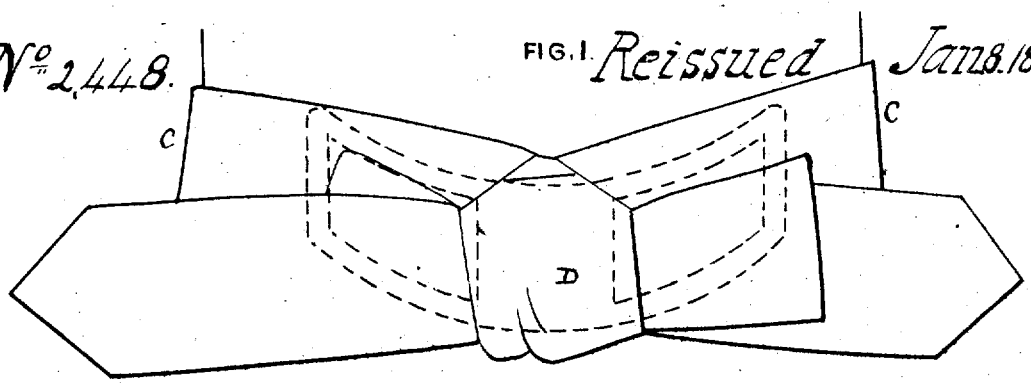

In order to enable others to make and apply my invention, I will now proceed to describe the manner of constructing and using the same. On reference to the accompanying drawing, which forms a part of this specification, Figure 1 is a front view of a turn-down or "Byron" collar, with a tie or cravat secured by my improved holder.

Figure 2:
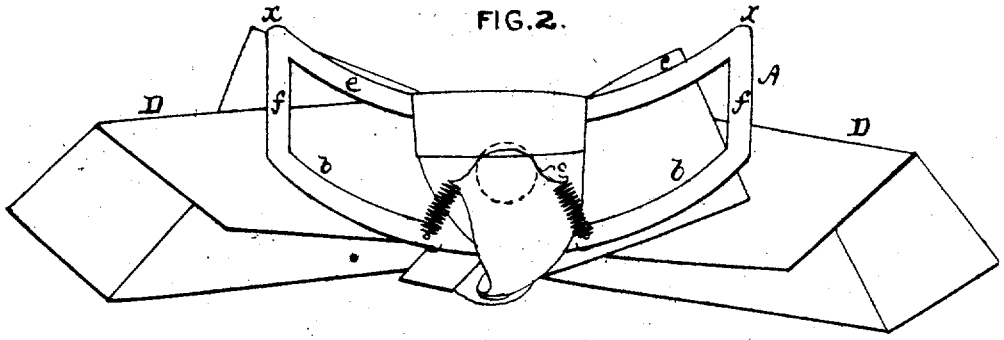

Figure 2, a rear view of the holder and tie.

Figure 3:
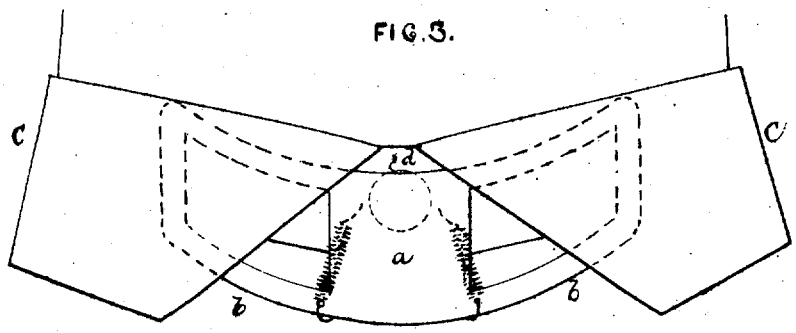

Figure 3, a front view of the collar and holder without the tie; and

Figure 4:
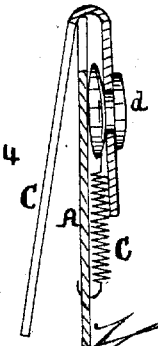

Figure 4, a transverse section of the collar and holder, drawn to an enlarged scale.

C represents an ordinary turn-down or "Byron" collar, the ends of which are secured by a button or stud, *d*, to the collar-band of the shirt as usual. A is the cravat holder, and is composed of a plate of metal which may be cut to the form best observed on reference to figs. 2 and 3; the holder occupying a position between the folds of the collar, and being bent to suit the curve of the latter. Two openings are so cut in this plate as to leave a central portion, *a*, the remaining portion of the plate consisting of the light curved ribs *b e*, and vertical ribs *f*; the upper corners *a a* being rounded and bearing against the inside of the collar at the point where the latter is folded, (see fig. 4.) In order to maintain the holder in its proper position between the folds of the collar, I use a loop, *c*, of light wire, part of which is coiled in the form of spiral springs; the ends of the wire being connected to the holder near the lower edge of the same, and the upper cross-wire which connects the ends of the two coiled portions fitting over the stud or button, *d*. The springs, which are distended in order to place the loop over the button, tend to keep the holder up. One form of cravat or tie which may be used with the holder is about half the length of one which passes entirely round the neck; this short cravat is passed round the central portion *a*, of the holder, through the loop formed by the wire spring, and is tied in the form of a bow, as seen in the drawing. The holder with its bow is readily removed by simply raising the loop of wire, and detaching it from the button *d*. It will be seen, without further description, that my improved holder possesses the advantages of affording facilities for readily detaching the cravat from the neck, saves the time occupied in adjusting ordinary cravats and forming symmetrical bows, and saves expense as regards the amount of material required in the formation of the cravat. It will also be seen that the ribbon or tie can be readily detached from the holder by untying the same, whenever the wearer desires to apply another of a different pattern. If desirable, however, the holder may be used for retaining scarfs folded to any desired form, prior to being secured to the plate, and so attached to the latter that they can be removed without being unfolded. It will be evident that a gum-elastic cord may be used in place of the wire loop *c*.

I am aware that a bow permanently attached to a plate or holder, and furnished with a spring loop for attachment to the button of a shirt-band or collar, has been heretofore used; I therefore do not claim broadly such a device, but I limit my claim to, and desire to secure Letters Patent for—

1. A plate or holder A, secured in front of a collar so as to be detachable from the same, and adapted for the reception and retention of a detachable ribbon or tie, substantially as described.

2. In combination with a plate or holder, I claim the elastic loop *c*, composed of wire, parts of which are rendered elastic by being coiled, and the transverse portion of which is plain so as to readily fit over the stud or button.

In testimony whereof I have signed my name to this specification before two subscribing witnesses.

J. ALBERT ESHLEMAN.

Witnesses.

W. J. R. DELANY,

J. M. BAKER.